United States Patent [19]

Ota

[11] 4,338,631
[45] Jul. 6, 1982

[54] VIDEO SIGNAL, SPEED-CHANGE REPRODUCING SYSTEM

[75] Inventor: Yoshihiko Ota, Yokohama, Japan

[73] Assignee: Victor Company of Japan, Ltd., Yokohama, Japan

[21] Appl. No.: 58,537

[22] Filed: Jul. 18, 1979

Related U.S. Application Data

[63] Continuation-in-part of Ser. No. 891,409, Mar. 29, 1978, abandoned.

[30] Foreign Application Priority Data

Mar. 30, 1977 [JP] Japan .................. 53-15601

[51] Int. Cl.$^3$ .......................................... G11B 15/46
[52] U.S. Cl. .................................... 358/127; 360/10; 360/21; 360/64; 360/70; 360/73; 360/75
[58] Field of Search .............. 360/10, 33, 64, 73, 360/75, 21, 18, 37, 70; 358/127

[56] References Cited

U.S. PATENT DOCUMENTS

| 3,294,902 | 12/1966 | Maxey | 360/64 |
|---|---|---|---|
| 3,557,320 | 1/1971 | Hopf | 360/10 |
| 3,588,334 | 6/1971 | Camas | 360/10 |
| 3,678,186 | 7/1972 | Narita | 360/70 |
| 3,705,840 | 12/1972 | Kosugi | 360/70 |
| 3,821,787 | 6/1974 | Kihara | 360/70 |
| 3,925,816 | 12/1975 | Kihara | 360/33 |
| 3,943,562 | 3/1976 | Opelt | 360/10 |
| 3,959,818 | 5/1976 | Iketaki | 360/14 |
| 3,968,518 | 7/1976 | Kihara | 360/10 |
| 4,241,365 | 12/1980 | Koda | 360/10 |

Primary Examiner—Vincent P. Canney
Assistant Examiner—Alan Faber
Attorney, Agent, or Firm—Louis Bernat

[57] ABSTRACT

A video signal, speed-change reproducing system uses a tape on which a video signal has been recorded. The recorded tracks are disposed contiguously and obliquely relative to the longitudinal tape direction. The tracks are recorded and formed by a plurality of rotating heads having gaps of mutually different azimuth angles. The tape travels at a selected speed V represented by the equation $$V = V_0 \left( \frac{n \pm 2}{n} \right),$$

wherein Vo is the tape speed for normal reproduction (and recording), and n is a positive integer. For reproduction, a plurality of rotating reproducing heads have gaps of mutually different azimuth angles which are the same as the azimuth angles used at the recording time. These heads successively scan the tracks of the tape to reproduce the recorded video signal. The rotating reproducing head is controlled to rotate in such a phase relation that each time instant when the level of the reproduced signal becomes a minimum value is within or in the vicinity of a vertical blanking period.

6 Claims, 14 Drawing Figures

VIDEO SIGNAL, SPEED-CHANGE REPRODUCING SYSTEM

BACKGROUND OF THE INVENTION

The present application is a continuation-in-part application of U.S. Patent Application Ser. No. 891,409 filed Mar. 29, 1978, now abandoned.

The present invention relates generally to video signal, speed-change reproducing systems, and more particularly to a video signal, speed-change reproducing system for reproducing a video signal recorded on mutually adjacent tracks. The tracks are alternately picked up by two heads having mutually different azimuth angles so that the video signal are reproduced, such that noises are inconspicuous in the reproduced picture screen, at a selected predetermined speed which is different from the speed used for the recording.

The prior art employs a system wherein a video signal is recorded on a magnetic tape in parallel tracks, formed obliquely to the longitudinal direction of the magnetic tape. This tape may either be stopped or transported at different speeds at the time of playback in order to carry out a speed-change in the reproduction, such as quick-motion reproduction, slow-motion reproduction, or still picture reproduction. In this known system, the tape travel speed at the time of reproduction is different from that at the time of recording. The tracing path of the head relative to the tape during reproduction differs from the tracking path (track) of the head during recording.

In a conventional video signal recording and reproducing system, ordinarily, recording is carried out on a recording medium by forming tracks in a manner which leaves an unrecorded zone or band (called a "guard band") between neighboring tracks. These bands are required to prevent the generation of beat signals caused by the interference between reproduced signals of neighboring tracks due to tracking deviation of the head at the time of reproduction. When a tape recorded in this manner is played back by a speed-change reproduction system, the head traces over the track and the unrecorded band. When the head traces over the unrecorded band, the reproduced signal loses its signal strength level or disappears. For this reason, a noise is generated in the reproduced picture.

Accordingly, it is possible to select the tape speed so that this noise will be at an inconspicuous position on the picture screen. However, there has been a problem due to the limited variable range of tape speeds. For example, it is not possible to increase the tape speed to become three times the ordinary speed and, at the same time, to always place the noise at an inconspicuous position on the picture screen. Furthermore, in the above mentioned system, since unrecorded bands are provided between tracks, the utilization efficiency of the tape has been poor.

In addition, there has been a system wherein the angle of inclination of the tape is varied relative to the head rotating plane, in accordance with the tape speed. The heads will then trace accurately over the track at the time of speed-change reproduction. However, this system has been accompanied by problems relating to the complexity of the mechanism for varying the inclination angle of the tape. The complexity gives rise to high cost apparatus, and creates a difficulty of accurate tracking, in actual practice.

On the other hand, the assignee of the present invention has previously developed a system wherein tracks are formed on a tape without gaps to guard bands between neighboring tracks. Moreover, a color video signal can be recorded and reproduced on such tape without the occurrence of an interference beat disturbance. This system is described in U.S. Patent Application Ser. No. 731,935 entitled "Color video signal recording and/or reproducing system", filed Oct. 13, 1976, now U.S. Pat. No. 4,178,606.

In this previous system, a pair of azimuth heads have gaps which are inclined with a certain azimuth angle, in mutually opposite directions, with respect to a direction perpendicular to the longitudinal direction which is of the track. Neighboring tracks are formed in contiguous contact side-by-side without a gap or guard band therebetween. The phase of the chrominance signal is shifted by 90 degrees of every horizontal scanning period. The direction of this phase shifting is reversed from one track to the next neighboring track. In accordance with this system, the tape utilization efficiency is high since the tracks are in close contact with each other. Moreover, there is no beat disturbance.

In this developed system, if the tape speed is merely varied at will in order to carry out speed-change reproduction, a noise component due to a reduction of the reproduced signal level accompanying tracking deviation will appear at irregular positions on the reproduced picture screen. For this reason, the noise part in the picture moves, and the S/N ratio of the entire picture becomes poor. Consequently, a speed-change reproduced picture cannot be obtained in good picture quality.

SUMMARY OF THE INVENTION

Accordingly, it is a general object of the present invention to provide a novel and useful system for speed-change reproduction of video signals. Here an object is to provide for speed-change which is especially applicable to the above mentioned system, which has eliminated guard bands. In particular, and object is to overcome the above described difficulties.

Another object of the invention is to provide a system for speed-change reproduction of video signals in which any noise bar due to a lowering of the reproduced signal on the reproduced picture is always at a constant and inconspicuous position on the picture screen. Moreover, an object is to provide a wide speed-change range. In this system, the tape utilization efficiency is also high. By selecting the tape speed at a specific value at the time of reproduction, the noise bar is always produced at a certain position on the picture screen. Furthermore, by selecting the relative scanning phases of the heads to have a specific relationship to the tape, the noise bar can be caused to be at a constant and inconspicuous or invisible position on the picture screen. In addition, the speed-change range can be made wider than the range heretofore available in a known system.

Still another object of the invention is to provide a system for speed-change reproduction of video signals in which reverse reproduction is also possible by reversing the direction of tape travel.

Further objects and features of the invention will be apparent from the following detailed description when read in conjunction with the accompanying drawings.

DETAILED DESCRIPTION

Figure 1:
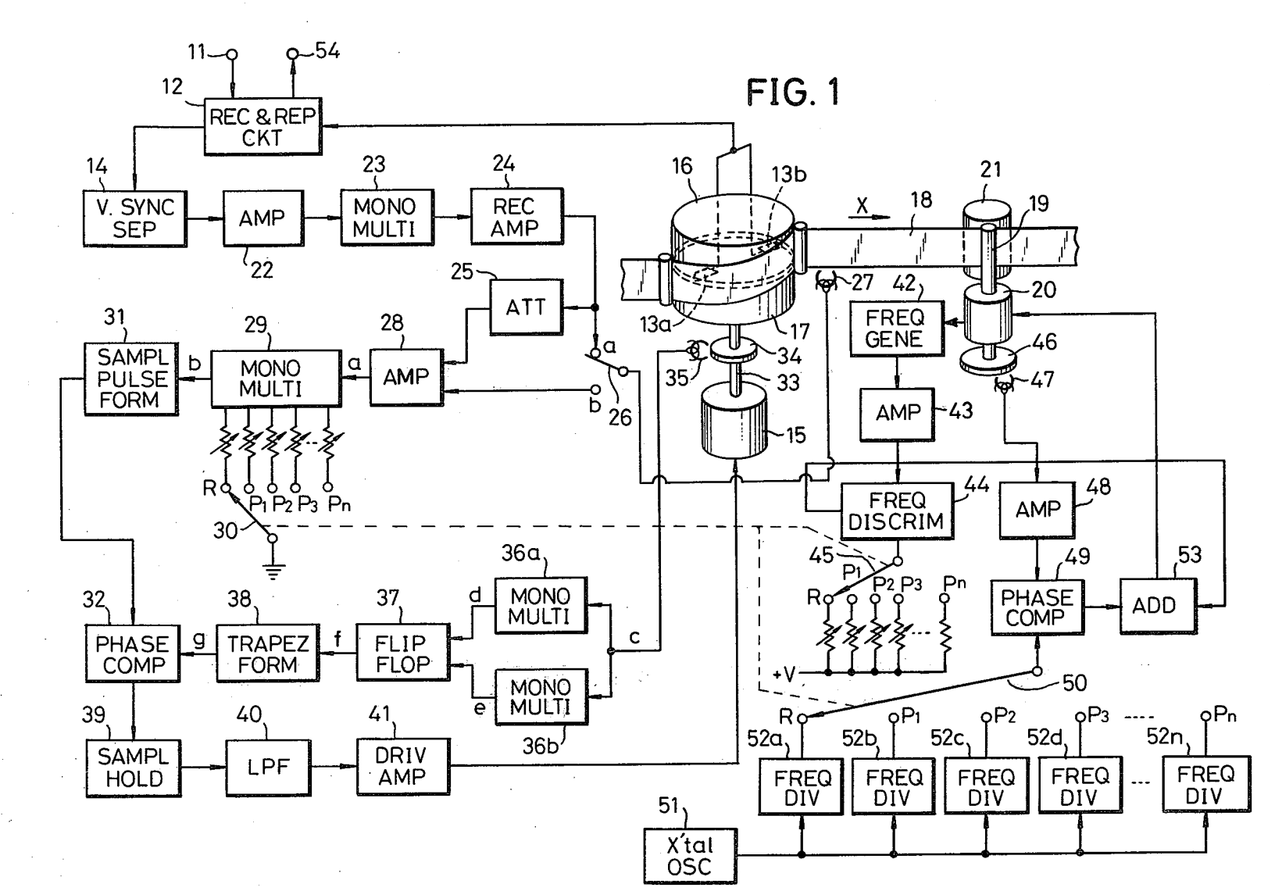
FIG. 1 is a block diagram of one embodiment of the system for speed-change reproduction of video signals, according to the invention.

In FIG. 1, a video signal to be recorded is introduced into the system shown through an input terminal 11, is passed through a recording and reproducing circuit 12, and is supplied to a pair of recording and reproducing video heads 13a and 13b and to a vertical synchronizing signal separation circuit 14. The video heads 13a and 13b have mutually opposite azimuths as described hereinafter and are mounted on diametrically opposite sides of a rotary drum 16, which is rotated at a rotational speed of 30 rps. by a head motor 15. A magnetic tape 18 is wrapped obliquely around the rotary drum 16 and a stationary drum 17. The tape is driven by a capstan 19 to travel in the arrow direction X. The tape is driven between a motor 20 and a pinch roller 21. A video signal is recorded by the video heads 13a and 13b which alternately trace along tracks on the tape 18. These tracks successively record one field per track. The tracks are positioned contiguously to each other and obliquely relative to the longitudinal direction of the tape.

On the other hand, a vertical synchronizing signal of 60 Hz which has been separated from the video signal in the vertical synchronizing signal separation circuit 14 is passed through an amplifier 22 and supplied to a monostable multivibrator 23. There its frequency is halved to 30 Hz. The resulting output signal is passed through a recording amplifier 24 and supplied to an attenuator 25. At the same time, the output signal is transmitted by way of a switch 26, with its moving contact on contact point a, to a control head 27, by which the signal is recorded as a control signal on the lower edge of the tape 18.

Figure 2:
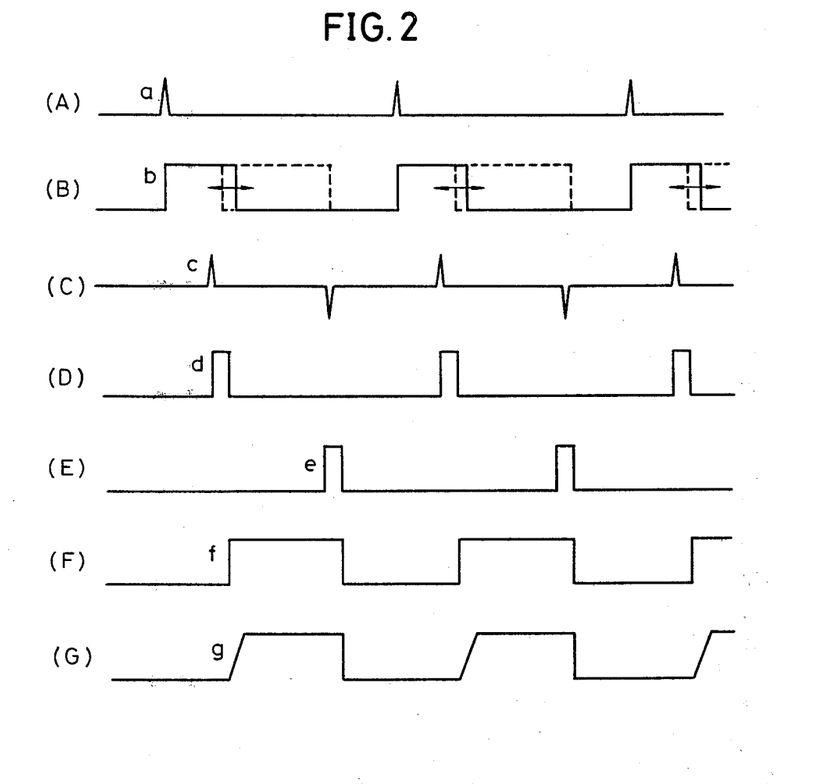
FIGS. 2(A) through 2(G) are diagrams respectively indicating the waveforms of signals at various parts of the system shown in FIG. 1.

The signal which has passed through the attenuator 25 is supplied through an amplifier 28 to a monostable multivibrator 29. The switching and setting of the time constant of this monostable multivibrator 29 is carried out by the change-over of a switch 30, as described hereinafter. Resistors of different resistance values are connected between the monostable multivibrator 29 and the contacts of the switch 30. This monostable multivibrator 29 produces a pulse signal output b as indicated in FIG. 2(B). The pulses rise in response to a signal a as indicated in FIG. 2(A) from the amplifier 28 and falls with a time constant which is selected by the switch 30. This switch 30 is connected to the contact point R at the time of recording and at the time of normal reproduction. The above mentioned output pulse signal b is formed into a sampling pulse signal by a sampling pulse forming circuit 31 and is thereafter supplied to a phase comparator (sampling circuit) 32.

The rotary drum 16 is coaxially mounted on a vertical rotating shaft 33, which is driven by the motor 15 and rotates together with the rotary drum 16. A pair of magnets of opposite polarity are mounted on a rotating disc 34 fixed coaxially to the rotating shaft 33. Together with rotation of the rotary drum 16, pulses c of positive polarity and negative polarity as indicated in FIG. 2(C) are picked up by a head 35 and are supplied to trigger monostable multivibrators 36a and 36b. The outputs d, e of the monostable multivibrators 36a and 36b, having waveforms as indicated in FIGS. 2(D) and 2(E), are supplied to a flip-flop circuit 37. The resulting output f of the flip-flop circuit 37 is the waveform indicated in FIG. 2(F) which is supplied to a trapezoidal wave forming circuit 38 to produce a trapezoidal wave g as indicated in FIG. 2(G), which is then supplied to the phase comparator 32.

In the phase comparator 32, the sampling pulses from the sampling pulse forming circuit 31 samples the inclined part of the trapezoidal wave. The resulting output signal of the phase comparator 32 is held by a sampling-holding circuit 39. The trapezoidal wave is then supplied through a low-pass filter 40 for removing high frequency components and integrating to a driving amplifier 41 and then to the motor 15, thereby controlling the rotation thereof. The rotational phase of the motor 15 is controlled to select the sampling position on the trapezoidal wave in the phase comparator 32. For example, sampling may be in the middle position of the inclined part of the trapezoidal wave.

In the above described embodiment, the rotation of the motor 15 is controlled by means of the phase comparator 32. However, the rotational phase of the motor 15 may be controlled by driving the motor 15 at a constant speed, while the phase comparator 32 controls an electromagnetic braking of the motor 15. Otherwise, the rotation of the capstan 19 may also be controlled by the output of the phase comparator 32 so that the travelling phase of the tape 18 is controlled thereby to control the scanning phases of the head 13a and 13b, with respect to the tracks on the tape 18.

Together with the rotation of the capstan motor 20, a frequency generator 42 coupled thereto produces an output signal. The output signal has a frequency which is higher than the frequency of the rotational pulse received from a detection head 47 and synchronized with the rotational frequency of the motor 20. This output signal is passed through an amplifier 43. The signal thus amplified is supplied to a frequency discriminator 44, where it is frequency discriminated. To the frequency discriminator 44 is connected a selection switch 45 whose moving contact can be connected to any of a plurality of contact terminals R and $P_1$ through $P_n$ respectively connected to different resistors. This switch 45 is selectively operated so that a voltage corresponding to a frequency to be discriminated is applied to the frequency discriminator 44. In the recording and normal reproducing modes, the moving contact of the switch 45 is connected to the terminal R.

Furthermore, a rotating disc 46 is coaxially fixed to the rotor shaft of the capstan motor 20 and is provided with a pair of magnets. A detection head 47 operates cooperatively with the magnets to output rotation pulses as the capstan motor 20 rotates. These rotation pulses are amplified in an amplifier 48 and supplied to a phase comparator 49. On the other hand, a crysta oscillator 51 is provided to supply a signal of a stable specific frequency to each of a plurality of frequency dividers 52a through 52n. These frequency dividers 52a through 52n, which are hereinafter described more fully, respectively have different specific frequency-dividing ratios corresponding to respective tape speeds from which a tape speed can be selected.

A selection switch 50 selects the output of one of these frequency dividers 52a through 52n. The output thus selected is supplied to the phase comparator 49, where it is compared with the signal from the detection head 47. The switch 50 is synchronously intercoupled with the above described switches 30 and 45 and therefore is operated interrelatedly therewith. The moving contacts of these switches 30, 45, and 50 are connected to their contacts R at the time of recording or of normal reproduction. The comparison error output of the phase comparator 49 is supplied to an adder 53, where it is added to the output signal from the above described frequency discriminator 44. The rotation of the motor 20 is controlled by the output signal of the adder 53.

At the time of speed-change reproduction mode of operation, the switches 30, 45, and 50 are switched to their contact points for the selected tape speed. The output of that frequency divider among the frequency dividers 52a through 52n which corresponds to the selected tape speed is supplied to the phase comparator 49. As a consequence, the motor 20 causes the tape 18 to travel at a predetermined speed in accordance with the speed-change reproduction mode, as described hereinafter. For still-picture reproduction, the motor 20 is not rotated, and the travel of the tape 18 is stopped. The video signals reproduced by the video heads 13a and 13b are passed through the recording and reproducing circuit 12 and led out through the output terminal 54.

At the time of reproduction, the moving contact of the switch 26 is switched to the contact point b. The control signal reproduced by the control head 27 is supplied through the switch 26 and the amplifier 28 to the monostable multivibrator 29. The switch 30 is switched, in accordance with the reproducing mode, to one of its contact points P1 through Pn respectively in order to complete a circuit through one of the resistors of different resistance values. The time constant of the monostable multivibrator 29 is selected by switching over of the switch 30 in accordance with the speed-change reproduction mode. By thus selecting a time constant, the fall position or trailing edge of the output pulse indicated in FIG. 2(B) is set.

At the time of reproduction, also, the motor 15 turns the rotary drum 16 at a rotational speed of 30 Hz. The signal picked up by the pickup head 35 and the output signal of the monostable multivibrator 29 are phased compared, and, in response to the resulting output signal, the rotational phase of the motor 15 is controlled. This operation is similar to that used at the time of recording.

The gaps of the video heads 13a and 13b respectively have mutually opposite azimuths. Therefore, due to azimuth losses no signal is reproduced if the video heads 13b and 13a respectively scan the tracks recorded by the video heads 13a and 13b (i.e., where a so-called reverse tracking is carried out). At the time of normal reproduction, the rotational phase of the motor 15 is controlled so that the sampling pulses will sample the middle part of the slope of the trapezoid wave which is formed in correspondence with pulses of positive polarity from the pickup head 35. These pulses of positive polarity are generated in coincidence with the rotational position of, for example, the head 13a. For this reason, in a normal reproduction mode, the rotational phases of the video heads 13a and 13b are controlled so that they always scan (positive tracking) the tracks recorded by these heads 13a and 13b, respectively. The reverse tracking does not occur.

Figure 3:
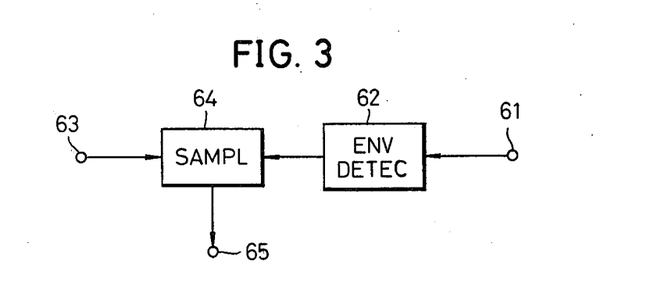
FIG. 3 is a block diagram of one example of an automatic correction circuit for reverse tracking.

To prevent reverse tracking, the circuit shown in FIG. 3 may be used if a control signal is not used. The reproduced frequency modulated video signal from the terminal 54 is applied to a terminal 61 of the circuit shown in FIG. 3 and subjected to envelope detection in an envelope detector 62. The resulting output is sampled in a sampling circuit 64 responsive to pulses from the signal of the pickup head 35, applied to a terminal 63. The resulting sampled output is led out through a terminal 65 and used for controlling the rotational phase of the motor 15.

In the system of the present invention, a speed-change reproduction is carried out when tape speed (inclusive of zero) is different from the tape speed used during normal reproduction. The tape speed is selected to satisfy the following equation:

$$V = V_o \left( \frac{n \pm 2}{n} \right)$$

where:

V is the tape speed for the speed-change reproduction mode;

Vo is the tape speed for a normal reproduction mode (and recording); and n is a positive integer.

The rotating speed of the heads 13a and 13b is always constant (i.e., 30 rps.) in all reproduction modes. By selecting the tape speed to satisfy this equation, there is a minimum of the reproduced signal level drop which occurs due to reproduction with the heads 13a and 13b deviating from their tracks (i.e., the distance from the tape edge, that is, the position on the reproduced picture screen). The minimum signal level is always constant, as described hereinafter.

If the tape speed does not satisfy the above equation, the position of the noise bar accompanying the minimal reproduced signal level is not constant in the reproduced picture. Consequently, the quality of the entire reproduced picture is impaired by the noise. A practically useful reproduced picture cannot then be obtained.

Next, there is an example of a fast (quick) motion reproduction wherein n is made equal to one (unity), and the positive-or negative symbol within the parenthesis is made positive, that is, V=3Vo, or triple-speed reproduction, which will be described in conjunction with FIGS. 4A and 4B.

Figure 4A:
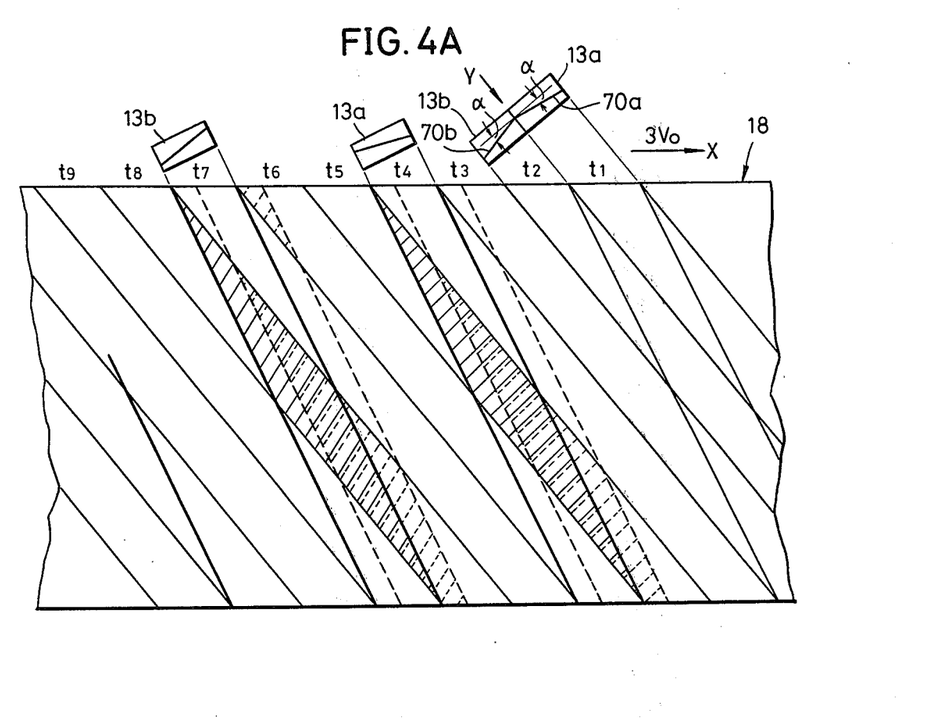
FIGS. 4A and 4B are respectively a diagram indicating the scanning track pattern at the time of triple-speed fast (quick) motion reproduction and a graph indicating the variation with time of the level of the reproduced signal.

As indicated in FIG. 4A, the video heads 13a and 13b have respective azimuth gaps 70a and 70b inclined at an azimuth angle α which is mutually in opposite directions, relative to the direction perpendicular to the scanning direction. The azimuth gaps 70a and 70b have the same track width. The tracks recorded and formed on the tape 18 by the video head 13a rotating in the arrow direction Y are designated by the characters $t_1, t_3, t_5, \ldots$ (wherein the subscripts of t are odd numbers). The tracks recorded and formed by the video head 13b are designated by the characters $t_2, t_4, t_6, \ldots$ (wherein the subscripts of t are even numbers). The tracks $t_1, t_2, t_3, \ldots$ are in contiguous contact without gaps or guard bands therebetween, whereby the tap utilization efficiency is high. Each track is recorded with a part of a video signal corresponding to substantially one field. A vertical synchronizing signal is positioned near an end of the track. Although not shown, an audio signal and a control signal are recorded respectively at the upper and lower lateral edges of the tape 18 and along tracks in the longitudinal direction of the tape.

For this triple-speed fast-motion reproduction, the moving contact of the switch 50 is connected to its contact point P1. A signal of a frequency corresponding to triple speed which has been frequency divided by the frequency divider 52b is thereby supplied to the phase comparator 49. As a consequence, the motor 20 is so controlled that it rotates at a speed which is three times that for normal reproduction of the tape 18.

Here, it will be assumed that the head 13a starts to scan from a position, for example, where it straddles or spans over portions of the tracks $t_3$ and $t_4$. The tape 18 is traveling at a speed $3V_o$ which is three times the tape speed for recording (or normal reproducing). The head 13a scans the tape along a path indicated by broken lines and terminates its scanning at a position where it straddles the tracks $t_5$ and $t_6$. Similarly, the head 13b scans from the position at which it straddles the tracks $t_6$ and $t_7$ as indicated by broken lines and terminates its scanning at the position where it straddles the tracks $t_8$ and $t_9$. Thereafter, the heads 13a and 13b trace other tracks in a similar manner.

Since the heads 13a and 13b have opposite azimuths when they respectively scan the tracks recorded by the head 13b and 13a, there is a reverse tracking and no signal is reproduced because of azimuth loss. For this reason, and in the case of the above mentioned example of scanning path, the head 13a reproduces a portion of the tracks $t_3$ and $t_5$ as indicated by the broken-line hatching. Similarly, the head 13b reproduces a portion of the tracks $t_6$ and $t_8$ as indicated by the broken-line hatching. For this reason, the level of the signal reproduced by the heads 13a and 13b varies as indicated by broken line in FIG. 4B.

The positions where the heads 13a and 13b respectively reproduce the entire widths of the tracks $t_4$ and $t_7$ are always at the same distances from their respective tape edges and are in the same positions in the longitudinal direction of the tape. Consequently, the level of the reproduced signal reaches its minimum point at the same instant of time, measured from the start of the scanning periods of the heads 13a and 13b. At the minimum point of the reproduced signal level, the S/N ratio is very small, and a noise bar is produced in the reproduced picture. However, this noise bar always appears at the same constant position in the reproduced picture.

Therefore, in accordance with the present invention, the tape speed is selected as indicated by the equation set forth above. This noise bar will always be at the same constant position in the reproduced picture. Moreover, the rotational phases of the heads are selected so that the noise bar will be at a position in the picture screen where it will be inconspicuous or invisible as described hereinbelow.

In triple-speed fast-motion reproduction, the moving contact of the switch 30 is connected to the contact point P1. The time constant of the monostable multivibrator 29 is selected at a value conforming to this reproduction mode. Accordingly, the fall or trailing edge of its output pulse signal, as indicated in FIG. 2(B), is extended to correspond to the pulses of negative polarity among the pulses derived from the pickup head 35, as indicated in FIG. 2(C), in accordance with the time constant of multivibrator 29.

The control system of the motor 15, described in conjunction with FIG. 1, controls the rotational phase of the motor 15. As a result, the pickup head 35 picks up a signal so that the central part of the trapezoid wave as indicated in FIG. 2(G) will be sampled by the sampling pulses indicated in FIG. 2(B). Thus, at the time of triple-speed fast-motion reproduction, a rotational control intentionally causes the heads 13a and 13b to carry out reverse tracking.

The traveling speed of the tape 18 is three times the normal speed in this example. The number of control signals reproduced by the control head 27 is three times greater than normal. Since there is a large time constant for the monostable multivibrator 29, it responds to the reproduced control signals in a proportion of one in three. It does not respond to the remaining two control signals.

For this reason, the heads 13a and 13b do not scan in the manner indicated by the broken lines. They start their scanning from the reverse tracking positions as indicated by the bold full lines, respectively (i.e. from the positions of the tracks $t_4$ and $t_7$). Consequently, the head 13a traces parts of the tracks $t_4$, $t_5$ and $t_6$, while the head 13b traces parts of the tracks $t_7$, $t_8$, and $t_9$. Because of azimuth loss, the signals of the tracks $t_4$ and $t_6$ are not reproduced by the head 13a. Only the signal of the indicated by the full line hatching on the track $t_5$ is reproduced. Through the head 13b, the signals of the tracks $t_7$ and $t_9$ are not reproduced. Only the signal of the part indicated by the full line hatching of the track $t_8$ is reproduced.

Figure 4B:
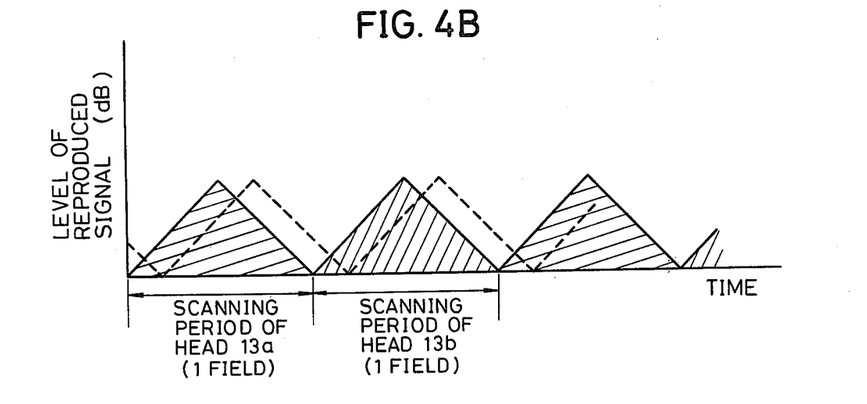

For this reason, the levels of the signals reproduced by the heads 13a and 13b vary as indicated by the full line in FIG. 4B. More specifically, the minimum points of the reproduced signal level coincide with the instants when the heads 13a and 13b start and complete their scanning. Then, since a vertical synchronizing signal is recorded at the end of the track, the noise bar accompanying the minimum points of the reproduced signal level falls within the vertical blanking period and does not appear in the reproduced picture.

Thus, the heads 13a and 13b carry out triple-speed fast-motion reproduction wherein the tracks $t_5$ and $t_8$ are reproduced with respect to one field per three fields. The reproduced picture moves with a speed which is three times greater than the speed during a normal reproduction. Moreover, no noise bar appears in the reproduced picture.

If a vertical synchronizing signal is not reproduced, the vertical synchronization of the picture may be achieved by using a separately generated vertical synchronizing signal. Furthermore, in order to assure the positive reproduction of the vertical synchronizing signal, the time constant of the monostable multivibrator 29 may be selected to determine the rotational phases of the heads. The minimum reproduced signal level point will be slightly offset from the position of the vertical synchronizing signal. A noise bar is slightly visible at the upper or lower edge of the reproduced picture, but it has almost no adverse effect in actual practice.

Next to be described is an example of reproduction under the condition of $n=2$, with a positive symbol within the parenthesis in the equation set forth hereinbefore, where $V=2Vo$. That is, there will be a double-speed fast-motion reproduction, FIGS. 5A and 5B.

Figure 5A:
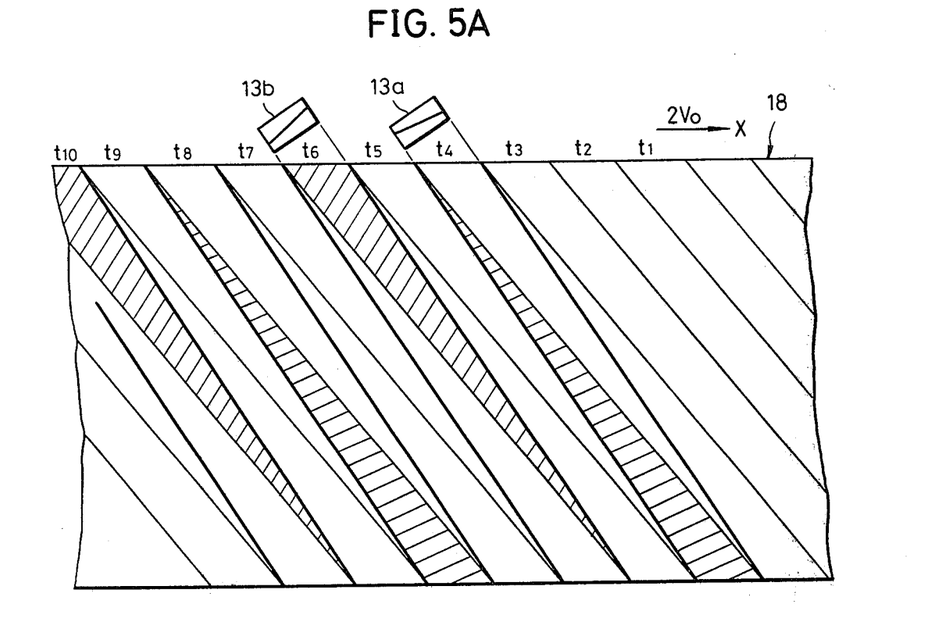
FIGS. 5A and 5B are respectively similar to FIGS. 4A and 4B for the case of double-speed, fast motion reproduction.

For double-speed fast-motion reproduction, the moving contacts of the switches 30, 45, and 50 are connected to their respective contact points P2. As a result of the switching of the switch 50 to its contact point P2, a signal frequency divided by the frequency divider 52c is supplied to the phase comparator 49, whereby the tape 18 travels at the speed 2Vo, which is twice the speed used for normal reproduction. As a result of the switching of the switch 30, the monostable multivibrator 29 is set at a time constant, for double-speed fast motion reproduction. As a consequence, the monostable multivibrator 29 responds to control signals in a proportion of one per two. The control signals are reproduced with double frequency through the control head 27. Its time constant is set so that the head 13a starts reverse tracking scanning.

The head 13a starts scanning from the track $t_4$, for example, and ends its scanning at the track $t_5$. The head 13b starts scanning from the track $t_6$ and ends its scanning at the track $t_7$. Thereafter, the heads 13a and 13b scan other tracks in a similar manner. In this case, the head 13a carries out reverse tracking with respect to the track $t_4$ and normal tracking with respect to the track $t_5$. The head 13b carries out normal tracking with respect to the track $t_6$ and reverse tracking with respect to the track $t_7$. Therefore, the heads 13a and 13b reproduce the tracks $t_5$, $t_6$, $t_9$, $t_{10}$ . . . as indicated by the hatching in FIG. 5A. Two fields out of four fields are reproduced. Thus, double-speed fast-motion reproduction is carried out at twice the speed of normal reproduction.

In this double-speed fast-motion reproduction, after the reproduction of two fields (i.e., one frame), one frame is skipped. Then the next one frame is reproduced. For this reason, there is less reduction of the vertical resolution than in the case of reproduction of every one field.

As the head starts and continues to scan from the starting end of the track $t_4$, the scanned area of the track $t_5$ increases. Consequently, the level of the reproduced signal also increases, becoming a maximum at the lower end of the track $t_5$. On the other hand, as the head 13b starts to scan from the starting end of the track $t_6$, the level of the reproduced signal is at its maximum value. The scanned area of the track $t_6$ decreases as the scanning proceeds. Accordingly, the reproduced signal level also decreases and becomes a minimum at the lower end of the track $t_6$.

Figure 5B:
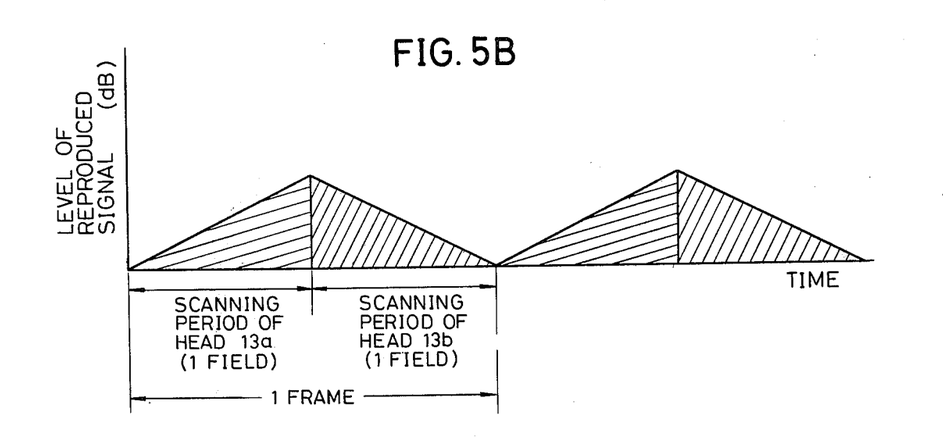

The levels of the signals reproduced by the heads 13a and 13b are indicated in FIG. 5B. The minimum point of the reproduced signal level occurs every two fields, that is, every one frame. Moreover, the accompanying noise bar is substantially within the vertical blanking period and is not conspicuous in the reproduced picture.

Figure 6A:
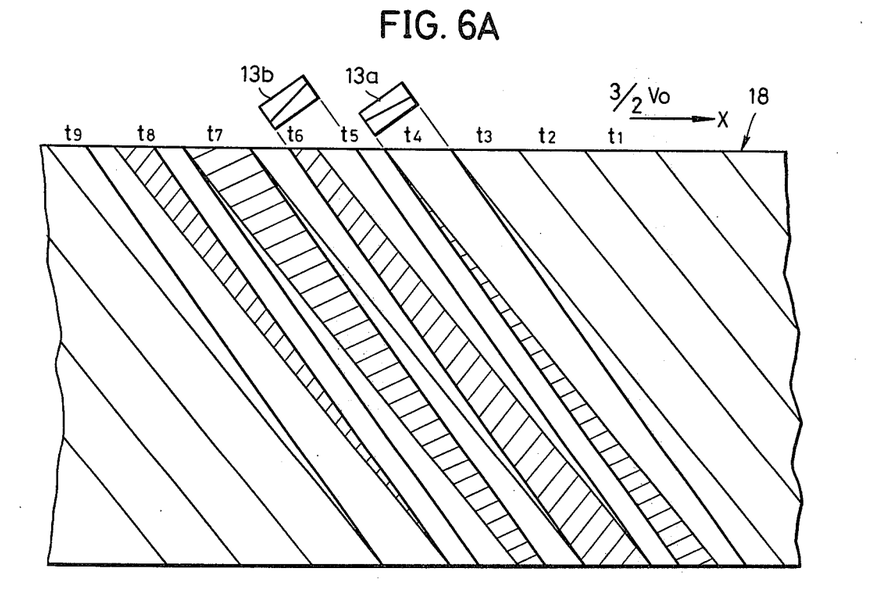
FIGS. 6A and 6B are respectively similar to FIGS. 4A and 4B for fast motion at 3/2 speed.
Figure 6B:
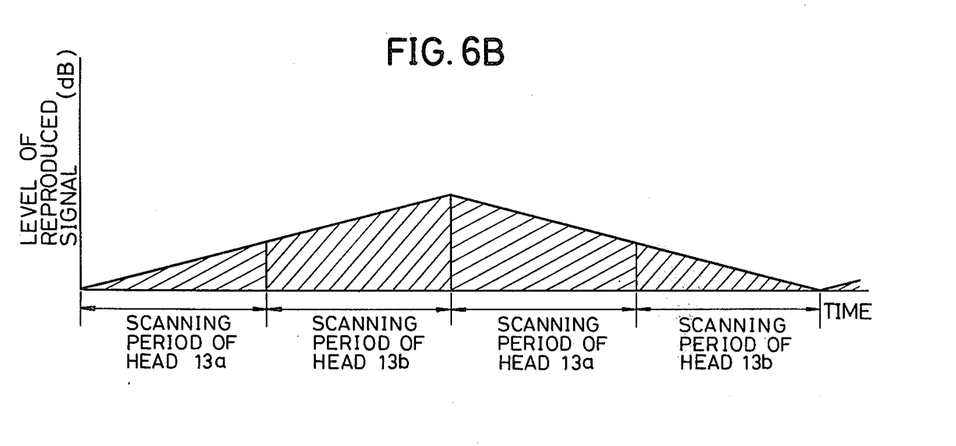

An example of reproduction under the condition of $n=4$ and positive symbol within the parenthesis in the equation set forth hereinbefore, whereby $V=(3/2)$ Vo, that is, 3/2-speed fast motion reproduction, will now be described with reference to FIGS. 6A and 6B.

In this case, the moving contacts of the switches 30, 45 and 50 are connected to the contact points P3. The tape 18 is driven at a speed of $(3/2)$ Vo, which is 1.5 times the speed used during normal reproduction.

When the head 13a starts scanning from the track $t_4$, for example, it completes scanning as it straddles the tracks $t_4$ and $t_5$. Then the head 13b starts scanning as it straddles the tracks $t_5$ and $t_6$ and ends scanning at the track $t_6$. The head 13a starts scanning from the track $t_7$ and ends its scanning as it straddles the tracks $t_7$ and $t_8$. The head 13b starts scanning as its straddles the track $t_8$ and $t_9$ and ends its scanning at the track $t_9$. Thereafter, the heads 13a and 13b scans other tracks in a similar manner.

In this case, the heads 13a and 13b carry out normal tracking respectively with respect to tracks $t_5$ and $t_7$ and tracks $t_6$ and $t_8$. The part indicated by hatching in FIG. 6A is reproduced. Accordingly, the reproduced signal level of the reproducing heads 13a and 13b is as indicated in FIG. 6B. The parts of minimum level occur every four fields, substantially within vertical blanking periods. Since parts of the tracks $t_4$ through $t_9$ corresponding to four fields out of six fields are reproduced, 3/2-speed fast-motion reproduction of a picture is obtained.

The foregoing examples concern fast-motion reproduction. Next, slow-motion reproduction will be described.

Figure 7:
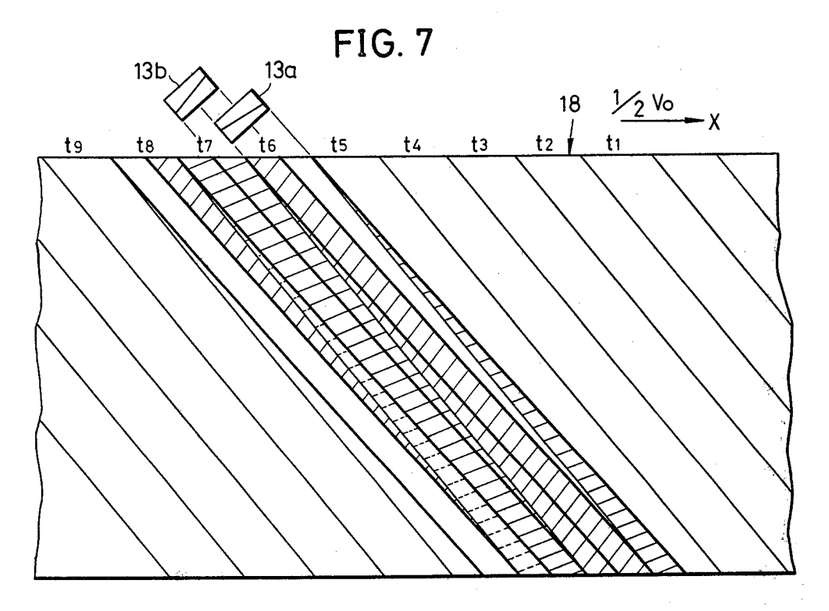
FIG. 7 is a diagram indicating the scanning track pattern at the time of half-speed slow motion reproduction.

If the equation set forth hereinbefore, $n=4$ and symbol within the parenthesis, is negative, V becomes $(\frac{1}{2})$Vo, whereby $\frac{1}{2}$-speed slow-motion reproduction is carried out, as described hereinafter with reference to FIGS. 7A and 7B.

The switch 50 is switched, whereby the tape 18 is driven at a speed of $(\frac{1}{2})$ Vo, which is one half of the speed, used during ordinary reproduction. The switch 30 is also switched accordingly. The time constant of the monostable multivibrator 29 is such that the head servo control is carried out at a halved frequency of the reproduced control signal.

The head 13a starts scanning from the track $t_6$, for example, and ends its scanning as it straddles the tracks $t_5$ and $t_6$. Then the head 13b starts scanning as it straddles the tracks $t_6$ and $t_7$ and ends its scanning at the track $t_6$. The head 13a starts scanning from the track $t_7$ and terminates its scanning as it straddles the tracks $t_7$ and $t_6$. The head 13b starts scanning as it straddles the tracks $t_7$ and $t_8$ and ends its scanning at the track $t_7$. Then the head 13a starts scanning from the track $t_8$ and ends its scanning as it straddles the tracks $t_7$ and $t_8$. Thereafter, similar scanning is carried out with respect to the other tracks.

Since the heads 13a and 13b accomplish normal tracking with respect to the tracks $t_5$ and $t_7$ and the tracks $t_6$ and $t_8$, respectively, the parts indicated by hatching in FIG. 7A are reproduced. Accordingly, the signal level reproduced by the heads 13a and 13b becomes similar to that indicated in FIG. 6B. The minimum level occurs every four fields and substantially within vertical blanking periods. Since the respective tracks are reproduced by each head scanning each track two times, a slow-motion picture is reproduced at one-half normal speed.

An example of slow-motion reproduction at one-third normal speed occurs under the condition of $n=3$ and with a negative symbol within the parenthesis in the equation set forth hereinbefore. When $V=(\frac{1}{3})Vo$, there is a $\frac{1}{3}$-speed slow-motion reproduction, which will now be described with reference to FIGS. 8A and 8B.

Figure 8A:
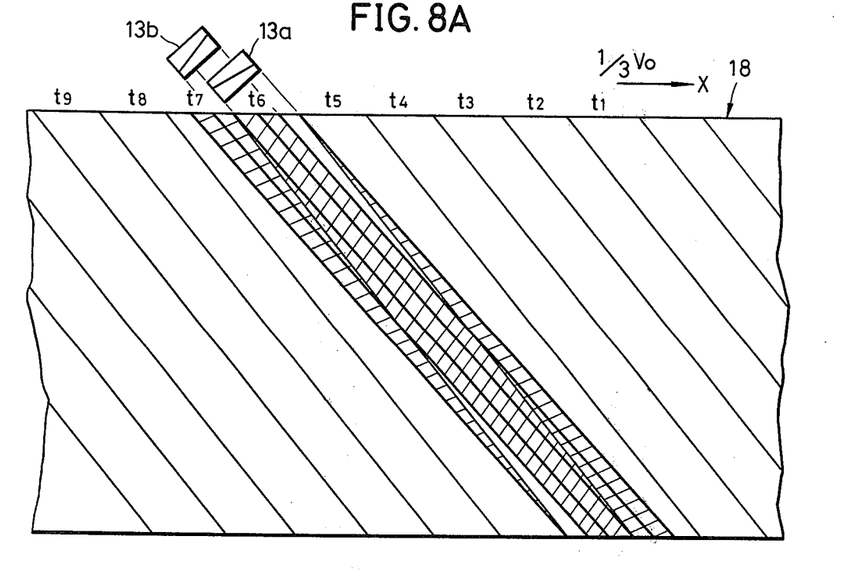
FIGS. 8A and 8B are respectively similar to FIGS. 4A and 4B for ⅓ speed slow motion reproduction.

The tape 18 is driven at a speed of $(\frac{1}{3})Vo$, which is $\frac{1}{3}$ of the normal reproduction speed. When the head 13a starts its scanning from track $t_6$, for example, it ends its scanning as it straddles the tracks $t_5$ and $t_6$. The head 13b starts its scanning as it straddles the tracks $t_6$ and $t_7$ and, after scanning over the entire track $t_6$, ends its scanning as it straddles the tracks $t_6$ and $t_5$. Then the head 13a starts its scanning as its straddles the tracks $t_6$ and $t_7$ and ends its scanning at the track $t_6$. Thereafter, similar scanning is carried out with respect to the other tracks.

Figure 8B:
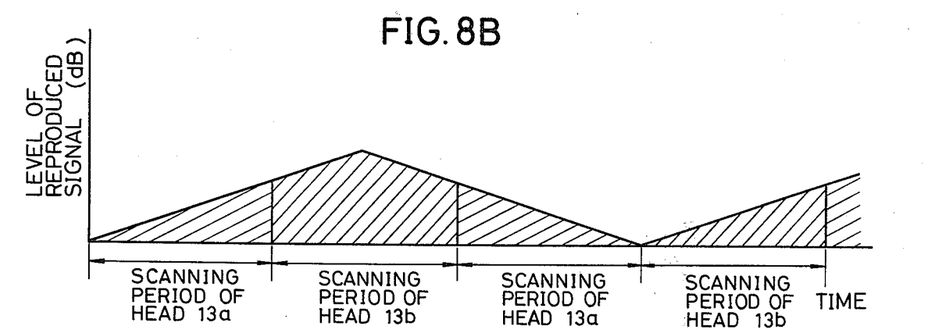

Accordingly, the reproduced signal level of the heads 13a and 13b is indicated in FIG. 8B. The minimum reproduced signal level point occurs every three fields, substantially within the vertical blanking period.

If, in the equation set forth hereinbefore, n is made to equal 2, and if the symbol within the parenthesis is negative, the tape velocity V becomes zero. Still picture reproduction is carried out while the tape is stopped.

Figure 9:
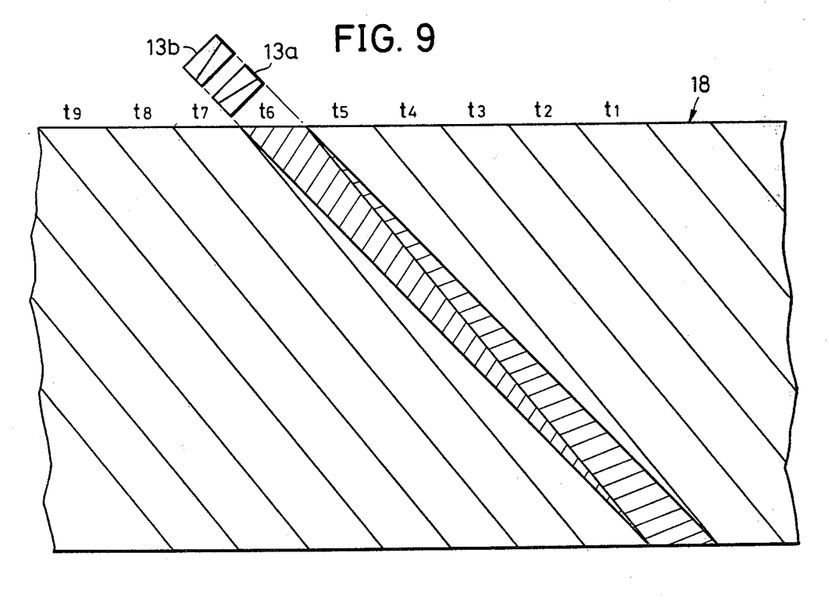
FIG. 9 is a diagram indicating the scanning track pattern at the time of still picture reproduction.

In FIG. 9, when the head 13a starts to scan from the track $t_6$, for example, it ends its scanning at the track $t_5$. Since the tape 18 is stopped, the head 13b also starts scanning from the track $t_6$ and ends its scanning at the track $T_5$. Thereafter, the above described scanning operation is repeated. Since the tracks 13a and 13b have a normal tracking relationship to the tracks $t_5$ and $t_6$, respectively, the parts indicated by hatching are reproduced. Accordingly, the reproduced signal level of the heads 13a and 13b becomes as indicated in FIG. 5B.

Since the tape travel is stopped, no control signal is reproduced. For this reason, the rotational phases of the heads 13a and 13b are not controlled as in the above described reproduction modes. The exact track end position on the tape from which scanning will start cannot be readily determined. If each of the heads starts its scanning from the position where it straddles two tracks, a noise bar appears at a conspicuous position in the reproduced picture. By manually shifting the tape through a very small distance, each head starts its scanning at the starting end of a track. The noise bar is hidden within the vertical blanking periods.

The reproduced video signal is almost nonexistent at a minimum level point of the reproduced signal. The reproduced horizontal synchronizing signal is also almost nonexistent. Accordingly, it is also possible to utilize this phenomenon and cause the noise bar to be automatically within the vertical blanking period. A known sampling technique detects the presence or absence of a reproduced horizontal synchronizing signal and whether or not the level is below a specific level. By this method, there is a sampling of the reproduced horizontal synchronizing signal and the output signal of a sawtooth wave oscillator or a slicing of the outputs obtained by gating the two signals at a specific level. The resulting detection signal may be used to trigger a monostable multivibrator. The resulting output of the multivibrator is used to rotate the capstan motor 20 intermittently during very small periods, to cause the tape 18 to shift intermittently through minute distances. Each head may thus be positioned to start its scanning at exactly the starting end of a track, as indicated in FIG. 9.

In the equation set forth hereinbefore, if n is made to equal one (unity), and the symbol within the parenthesis is negative, the tape velocity V becomes $-Vo$. The direction of travel of the tape will reverse. These are conditions for a reverse-motion reproduction.

Figure 10:
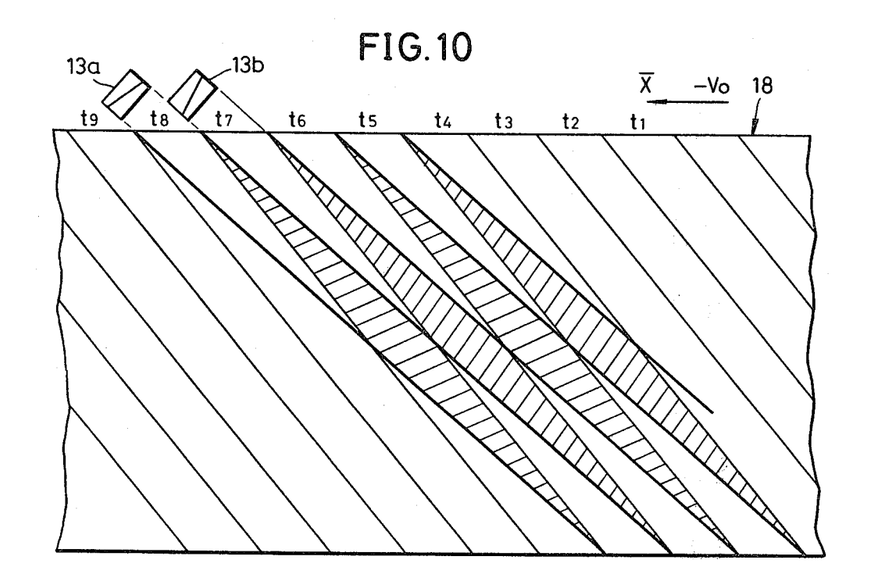
FIG. 10 is a diagram indicating the scanning track pattern at the time of reverse normal-speed reproduction.

The tape 18 is driven in reverse travel (in the arrow direction X), opposite to the direction X, at a speed of Vo as indicated in FIG. 10. The switch 30 also is switched to cause the time constant of the monostable multivibrator 29 to be of a value which is suitable for reverse-motion reproduction.

When the head 13a starts to scan from the track $t_8$, for example, it scans the track $t_7$ and further ends its scanning and the track $t_6$. The head 13b starts to scan the track $t_7$ and, scanning the track $t_6$, ends its scanning at the track $t_5$. Similarly, the head 13a scans from the track $t_6$ to the track $t_4$, while the head 13b scans from the track $t_5$ to the track $t_3$.

Thereafter, scanning is similarly carried out, with respect to the other tracks.

In this case, the heads 13a and 13b have a relationship wherein they carry out normal tracking with respect to the tracks $t_7, t_5, t_3, \ldots$ and the tracks $t_6, t_4, \ldots$, respectively. The head 13a reproduces the tracks $t_7, t_5, \ldots$, and the head 13b reproduces the tracks $t_6, t_4, \ldots$, as indicated by the hatching in FIG. 10. Accordingly, the reproduced signal level of the heads 13a and 13b are as indicated by full line in FIG. 4B.

In this case, the reproduction is carried out in a track sequence which is the reverse to the recording track sequence of tracks $t_7, t_6, t_5, t_4, \ldots$. Reverse-motion reproduction thus occurs, wherein the picture sequence and the movement are reversed relative to that of a normal reproduction.

When the tape 18 travels in the reverse direction, the polarity of the reproduced control signal is reversed. Therefore, an inverter may be provided to reinvert the polarity.

In each of the above described embodiments of the invention, the rotational phases of the rotating heads 13a and 13b are controlled to position the noise bar, due to the minimum reproduced level, substantially within the vertical blanking periods. The rotation of the motor 20 may be controlled in order to control the traveling phase of the tape 18.

In this connection, the general equation for the tape speed for speed-change reproduction selected by the system of the present invention is $$V = Vo\left(\frac{n \pm 2}{n}\right)$$

as mentioned hereinbefore. It will be observed that, as the integer n increases in value, the tape speed V approaches the value of the speed Vo. For this reason, in an actual apparatus to which the system of the present invention has been applied, it is not necessary to carry out speed-change reproduction with respect to all values of this integer n. If the kinds of speed-change reproduction mode are of the order in the above described embodiment of the invention, the requirements of speed-change reproduction mode can be satisfied almost completely for practical purposes. For this reason, the numbers of the resistors and frequency dividers which can be selectively switched by the switches 30, 45, and 50 need not be very large for practical purposes.

In the embodiment described with reference to FIG. 1, the signal crystal oscillator 51 and the frequency dividers 52a through 52n are employed to obtain different predetermined frequencies corresponding to the tape speed. This invention is not limited to this embodiment. For example, a plurality of oscillators, which respectively oscillate different predetermined frequencies, may be provided. In this case, the oscillated outputs may be selected by the switch 50.

The video signals reproduceable by the system of the present invention are not limited to color video signals. They may also be monochrome video signals. The only requirement is that these signals shall have been recorded by heads having different azimuth angles on mutually neighboring tracks.

Further, this invention is not limited to these embodiments. Variations and modifications may be made without departing from the scope of the invention.

What is claimed is:

1. A video signal, speed-change reproducing system for reproducing video signals which are recorded on a tape, said signals being recorded by a pair of rotary recording heads alternately contacting said tape, said heads being mounted on diametrically opposed sides of a rotating member, said video signals being recorded on contiguous video tracks disposed obliquely relative to the tape longitudinal direction, said recording heads having gaps of mutually different azimuth angles, said tape further having a control signal track recorded along a transverse edge, said control signals corresponding to the rotational position of the recording heads, the reproducing system comprising: driving means for transporting said tape;

a first control means for controlling said driving means to cause said tape to travel at a selected speed V represented by the equation $$V = V_0 \left( \frac{n \pm 2}{n} \right),$$

wherein Vo is the tape speed for normal reproduction (and recording), and n is a positive integer, said first control means also causing the tape to stop;

means comprising a rotational member having a pair of reproducing heads mounted on diametrically opposed sides thereof, said reproducing heads having gaps of mutually different azimuth angles which are the same as said azimuth angles of the recording heads, said reproducing heads successively scanning said video tracks on the tape to reproduce said recorded video signal;

a fixed head for picking up the control signal from said edge track; and a second control means for controlling both the relative phases of the rotational member having said reproducing head thereon, and the tape travel so that said rotational phase of the rotating member is maintained in a predetermined phase relationship with respect to the picked up control signal, said predetermined phase being such that each time instant when the level of the reproduced signal becomes a minimum value falls within or in the vicinity of a vertical blanking period.

2. A video signal, speed-change reproducing system as claimed in claim 1 in which said driving means comprises a capstan for causing said tape to travel and a capstan motor for causing said capstan to rotate; and said first control means comprises means for supplying a plurality of signals of predetermined frequencies corresponding to the predetermined tape speeds of reproducing modes to be selected, means for deriving selectively one of said predetermined frequency signals corresponding to the selected reproducing mode, and means for controlling the rotation of the capstan motor in response to the selectively derived frequency signal.

3. A video signal, speed-change reproducing system as claimed in claim 1 in which said driving means comprises a capstan for causing said tape to travel and a capstan motor for causing said capstan to rotate; and said first control means comprises means for oscillating a constant frequency reference signal, means for frequency-dividing said oscillated reference signal into a plurality of signals of predetermined frequencies corresponding to reproducing modes, means for selectively deriving the frequency divided signal corresponding to the reproducing mode, means for detecting rotations of the capstan motor, and a phase comparator for comparing phases of the output of detecting means and frequency signal which has been selectively derived, and for controlling the rotation of the capstan motor by the output error signal of the phase comparator.

4. A video signal, speed-change reproducing system as claimed in claim 1 in which a vertical synchronizing signal of the video signal is recorded near an end part of each of the video tracks, and said control means minimizing, at the starting or the terminal end of a video track, the area of the video track, which area is scanned by one of the reproducing heads which has a gap with the same azimuth angle as the gap on one of the recording heads.

5. A video signal, speed-change reproducing system as claimed in claim 1 in which said second control means comprises:

monostable multivibrator means triggered responsive to the control signal which is picked up by the fixed head, said monostable multivibrator means having an adjustable time constant;

means for switching said setting the time constant of said monostable multivibrator means in accordance with a selected speed-change reproducing mode;

means for detecting the rotational phase of said rotational member;

means for phase comparing said signal from the detecting means with the output signal of the monostable multivibrator means; and means responsive to the output signal of the phase comparing means for controlling the relative phases of the rotating member and the tape travel to position and coordinate the vertical blanking period of the video signal with the minimum level of the reproduced signal.

6. A video signal, speed-change reproducing system as claimed in claim 1 in which said first control means controls said driving means so that the tape travels in a speed of 3 Vo; and said second control means controls the rotation phase of the rotational member so that each of said reproducing heads starts its reverse tracking and reproducing from the end of the track recorded by the recording head having azimuth angle different from the azimuth angle of the reproducing head.

* * * * *